(12) United States Patent
Huang

(10) Patent No.: US 11,759,300 B1
(45) Date of Patent: Sep. 19, 2023

(54) ELECTRIC TOOTHBRUSH

(71) Applicant: Xianhua Huang, Gao'an (CN)

(72) Inventor: Xianhua Huang, Gao'an (CN)

( * ) Notice: Subject to any disclaimer, the term of this patent is extended or adjusted under 35 U.S.C. 154(b) by 0 days.

(21) Appl. No.: 17/952,640

(22) Filed: Sep. 26, 2022

(30) Foreign Application Priority Data

Sep. 15, 2022 (CN) .......................... 202211121706.4

(51) Int. Cl.
| | | |
|---|---|---|
| *A61C 17/028* | (2006.01) | |
| *A61C 17/32* | (2006.01) | |
| *A61C 17/22* | (2006.01) | |
| *A61C 17/36* | (2006.01) | |
| *A61C 17/02* | (2006.01) | |
| *A46B 9/04* | (2006.01) | |
| *A46B 13/04* | (2006.01) | |
| *A46B 11/06* | (2006.01) | |
| *A46B 13/02* | (2006.01) | |
| *A46B 11/00* | (2006.01) | |

(52) U.S. Cl.
CPC .............. *A61C 17/028* (2013.01); *A46B 9/04* (2013.01); *A46B 11/06* (2013.01); *A46B 13/04* (2013.01); *A61C 17/0202* (2013.01); *A61C 17/225* (2013.01); *A61C 17/32* (2013.01); *A61C 17/36* (2013.01); *A46B 11/0055* (2013.01); *A46B 13/023* (2013.01); *A61C 17/22* (2013.01)

(58) Field of Classification Search
CPC ..... A61C 17/028; A61C 17/32; A61C 17/225; A61C 17/36; A61C 17/0202; A61C 17/16; A61C 17/22; A61C 17/221; A46B 9/04; A46B 13/04; A46B 11/06; A46B 11/0079; A46B 5/0095; A46B 13/02; A46B 13/023; A46B 11/002; A46B 11/0055

USPC ..................... 401/188 R, 268, 270, 282, 289
See application file for complete search history.

(56) References Cited

U.S. PATENT DOCUMENTS

| | | | | |
|---|---|---|---|---|
| 6,957,925 | B1* | 10/2005 | Jacobs | ................. A46B 11/001 401/175 |
| 7,080,980 | B2* | 7/2006 | Klupt | ..................... A61C 17/28 601/162 |
| 11,253,054 | B1* | 2/2022 | Kuunyeeh | ................ A46B 9/04 |
| 2013/0011177 | A1* | 1/2013 | Kuo | ...................... A61C 17/227 15/22.1 |
| 2022/0273405 | A1* | 9/2022 | Yang | .................. A61C 17/0202 |

* cited by examiner

*Primary Examiner* — David J Walczak

(57) ABSTRACT

An electric toothbrush includes a handle provided with a liquid feeding port, a toothbrush head connected to the handle and provided with a liquid discharging port communicated to the liquid feeding port through a liquid transfer passageway, a pumping mechanism disposed at the liquid transfer passageway and used for providing a pumping force for the liquid transfer passageway so as to transfer liquid from the liquid feeding port to the liquid discharging port and spray the liquid, and a transmission mechanism disposed on the handle and connected to the toothbrush head to drive the toothbrush head have a reciprocating motion relative to the handle.

18 Claims, 14 Drawing Sheets

ELECTRIC TOOTHBRUSH

CROSS-REFERENCE TO RELATED APPLICATIONS

The application claims priority of Chinese patent application 202211121706.4, filed on Sep. 15, 2022, which is incorporated herein by reference in its entireties.

TECHNICAL FIELD

The present disclosure relates to the field of electric toothbrushes, in particular, to an electric toothbrush with a rinsing function.

BACKGROUND

With the improvement of the living standard, more and more people pay attention to personal hygiene and health. As an important direction in personal cleaning, oral cleaning care has also received attention. In recent years, more and more people like to use electric toothbrushes because the electric toothbrushes have high cleaning efficiency, convenience and the like. However, the existing electric toothbrushes generally do not have a rinsing function. When teeth need to be cleaned, it is often necessary to cooperate with external tooth cleaning equipment to clean teeth, so that the electric toothbrush is extremely inconvenient to use.

SUMMARY

In order to overcome the shortcomings in the prior art, the present disclosure provides an electric toothbrush which can rinse teeth while brushing the teeth.

The present disclosure adopts the following technical solution: an electric toothbrush including a handle and a toothbrush head, wherein the toothbrush head is connected to the handle; the handle is provided with a liquid feeding port; the toothbrush head is provided with a liquid discharging port; the liquid feeding port is communicated to the liquid discharging port through a liquid transfer passageway; the liquid transfer passageway is provided with a pumping mechanism; the pumping mechanism is used for providing a pumping force for the liquid transfer passageway, so as to transfer liquid from the liquid feeding port to the liquid discharging port and spray the liquid; the handle is provided with a transmission mechanism; and the transmission mechanism is connected to the toothbrush head to drive the toothbrush head have a reciprocating motion relative to the handle.

Further, the liquid transfer passageway includes a connection valve; the connection valve is provided with a first chamber, a second chamber, and a third chamber; the first chamber is communicated with the second chamber through the third chamber; the first chamber is provided with a liquid inlet; the liquid inlet is communicated with the liquid feeding port; the second chamber is provided with a liquid outlet; and the liquid outlet is communicated with the liquid discharging port.

Further, a drainage portion is arranged between the third chamber and the first chamber; a first liquid guide opening is formed in the drainage portion to communicate the third chamber to the first chamber; the third chamber is further provided with a second liquid guide opening; and the second liquid opening is communicated with the second chamber.

Further, he second chamber is provided with a one-way valve at the liquid outlet; the one-way valve is used for controlling opening and closing of the liquid outlet; the connection valve further includes an umbrella-shaped valve; the umbrella-shaped valve is provided with a head portion and an umbrella handle portion; a plugging hole is formed in drainage portion; and the umbrella handle portion is fixed in the plugging hole, so that the head portion of the umbrella-shaped valve is clung to the first liquid guide opening to block the first liquid guide opening.

Further, the third chamber is further provided with a pumping port; and the pumping mechanism is connected to the pumping port, and does a reciprocating motion in the pumping port to provide the pumping force for the connection valve.

Further, the pumping mechanism includes a first driving device, a first eccentric wheel, and a transmission rod; a rotating end of the first driving device is in meshing connection with the first eccentric wheel; the first eccentric wheel is provided with a first eccentric portion; and the transmission rod sleeves the first eccentric portion to achieve the reciprocating motion of the transmission rod.

Further, the handle further includes a connector; the connector is internally hollow, a lower end of which is communicated with the liquid outlet and an upper end of which is communicated with the liquid discharging port; and the connector is detachably connected to the toothbrush head to detachably connect the toothbrush head to the handle.

Further, the transmission mechanism includes a second driving device and a second eccentric wheel; the connector is provided with a connection slot; a transmission end of the second driving device is in meshing connection to the second eccentric wheel; the second eccentric wheel is provided with a second eccentric portion; and the second eccentric portion is sleeved in the connection slot and does reciprocating motion in the connection slot to drive the connector to do reciprocating motion.

Further, the liquid transfer passageway further includes a first liquid guide pipe and a second liquid guide pipe; one end of the first liquid guide pipe is communicated to the liquid feeding port, and the other end is communicated to the liquid inlet; and one end of the second liquid guide pipe is communicated to the liquid outlet, and the other end is communicated to a lower end of the connector.

Further, the toothbrush head is internally hollow to form a fourth chamber; the fourth chamber forms a connection port in the lower end of the toothbrush head; the connection port sleeves an upper end of the connector to detachably connect the toothbrush head to the connector; the upper end of the toothbrush head is provided with a toothbrush head portion; a protrusion portion integrated with the toothbrush head portion is arranged on the toothbrush head portion; the protrusion portion is provided with a liquid spraying hole; and the liquid spraying hole is communicated with the fourth chamber to form the liquid discharging port.

The present disclosure adopts the following technical solution: an electric toothbrush including a handle provided with a liquid feeding port; a toothbrush head connected to the handle and provided with a liquid discharging port communicated to the liquid feeding port through a liquid transfer passageway; a pumping mechanism disposed at the liquid transfer passageway and used for providing a pumping force for the liquid transfer passageway so as to transfer liquid from the liquid feeding port to the liquid discharging port and spray the liquid; and a transmission mechanism disposed on the handle and connected to the toothbrush head to drive the toothbrush head have a reciprocating motion relative to the handle.

Further, the liquid transfer passageway includes a connection valve; the connection valve is provided with a first chamber, a second chamber, and a third chamber; the first chamber is communicated with the second chamber through the third chamber; the first chamber is provided with a liquid inlet; the liquid inlet is communicated with the liquid feeding port; the second chamber is provided with a liquid outlet; and the liquid outlet is communicated with the liquid discharging port.

Further, a drainage portion is arranged between the third chamber and the first chamber; a first liquid guide opening is formed in the drainage portion to communicate the third chamber to the first chamber; the third chamber is further provided with a second liquid guide opening; and the second liquid opening is communicated with the second chamber.

Further, the second chamber is provided with a one-way valve at the liquid outlet; the one-way valve is used for controlling opening and closing of the liquid outlet; the connection valve further includes an umbrella-shaped valve; the umbrella-shaped valve is provided with a head portion and an umbrella handle portion; a plugging hole is formed in drainage portion; and the umbrella handle portion is fixed in the plugging hole, so that the head portion of the umbrella-shaped valve is clung to the first liquid guide opening to block the first liquid guide opening.

Further, the third chamber is further provided with a pumping port; and the pumping mechanism is connected to the pumping port, and does a reciprocating motion in the pumping port to provide the pumping force for the connection valve.

Further, the pumping mechanism includes a first driving device, a first eccentric wheel, and a transmission rod; a rotating end of the first driving device is in meshing connection with the first eccentric wheel; the first eccentric wheel is provided with a first eccentric portion; and the transmission rod sleeves the first eccentric portion to achieve the reciprocating motion of the transmission rod.

Further, the handle further includes a connector; the connector is internally hollow, a lower end of which is communicated with the liquid outlet and an upper end of which is communicated with the liquid discharging port; and the connector is detachably connected to the toothbrush head to detachably connect the toothbrush head to the handle.

Further, the transmission mechanism includes a second driving device and a second eccentric wheel; the connector is provided with a connection slot; a transmission end of the second driving device is in meshing connection to the second eccentric wheel; the second eccentric wheel is provided with a second eccentric portion; and the second eccentric portion is sleeved in the connection slot and does reciprocating motion in the connection slot to drive the connector to do reciprocating motion.

Further, the liquid transfer passageway further includes a first liquid guide pipe and a second liquid guide pipe; one end of the first liquid guide pipe is communicated to the liquid feeding port, and the other end is communicated to the liquid inlet; and one end of the second liquid guide pipe is communicated to the liquid outlet, and the other end is communicated to a lower end of the connector.

Further, the toothbrush head is internally hollow to form a fourth chamber; the fourth chamber forms a connection port in the lower end of the toothbrush head; the connection port sleeves an upper end of the connector to detachably connect the toothbrush head to the connector; the upper end of the toothbrush head is provided with a toothbrush head portion; a protrusion portion integrated with the toothbrush head portion is arranged on the toothbrush head portion; the protrusion portion is provided with a liquid spraying hole; and the liquid spraying hole is communicated with the fourth chamber to form the liquid discharging port.

The present disclosure has the beneficial effects: by means of the above structure, the liquid feeding port is connected to an external water source. During use, a hose can be arranged at the liquid feeding port, and is placed in clean water or cleaning fluid. During use, the equipment is turned on to respectively control the pumping mechanism and the transmission mechanism to work. The pumping mechanism is used for providing the pumping force for the liquid transfer passageway, so as to pump the external water source into the liquid feeding port and transfer the external water source to the liquid discharging port through the liquid transfer passageway, and the external water source is finally sprayed by the liquid discharging port to form a pulse spout to achieve a teeth rinsing effect. The transmission mechanism is used for providing power for the toothbrush head for swinging relative to the handle. When teeth need to be brushed, the transmission mechanism can be started to enable the toothbrush head to swing left and right, so as to achieve a teeth brushing effect. In the teeth brushing process, when the teeth need to be cleaned with the clean water or cleaning fluid, the pumping mechanism can be started. Under the action of the pumping mechanism, the clean water or cleaning fluid is sprayed via the liquid discharging port to achieve the teeth rinsing effect. Compared with the traditional electric toothbrush or a traditional water pick, the electric toothbrush of the present disclosure can rinse the teeth while brushing the teeth, so that teeth brushing and teeth rinsing can be simultaneously carried out. This electric toothbrush is convenient to use and has a good user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
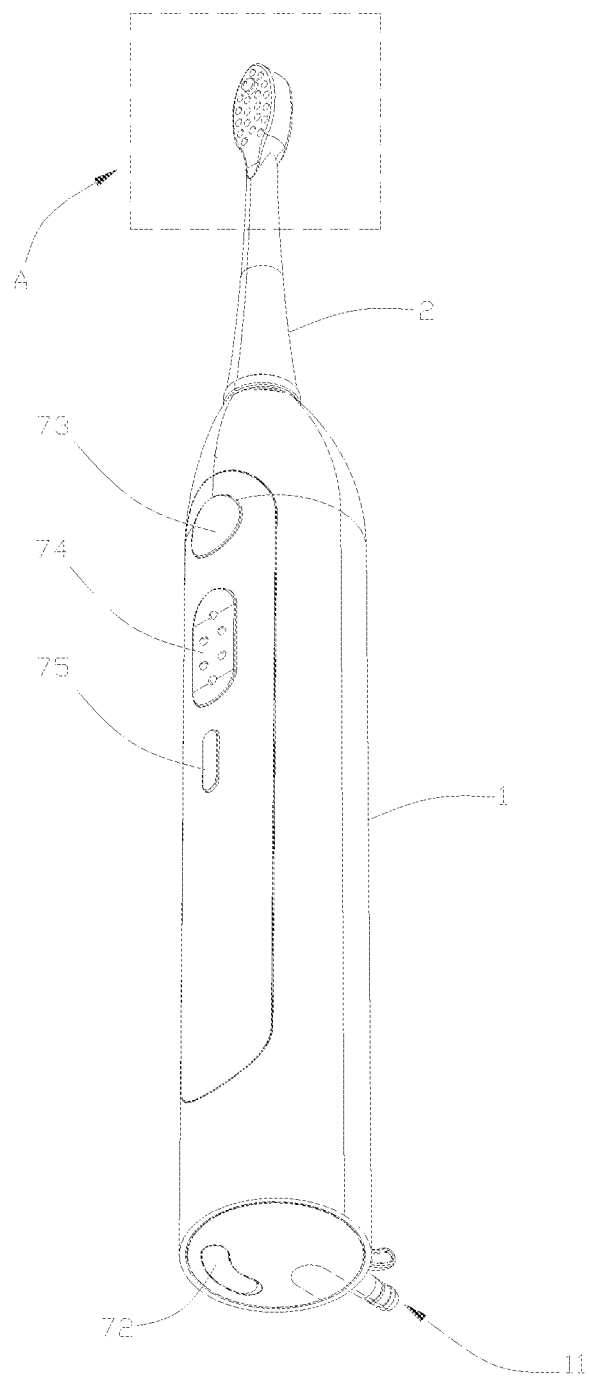
FIG. 1 shows a three-dimensional diagram of an electric toothbrush of the present disclosure.
Figure 2:
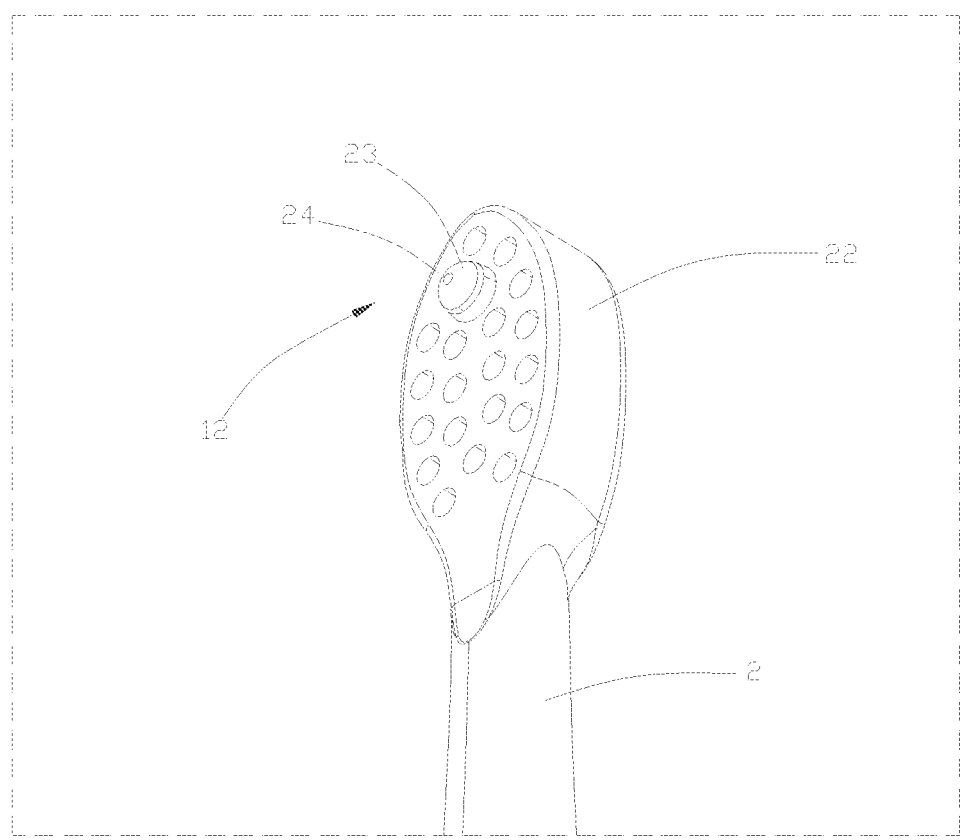
FIG. 2 shows a partially enlarged diagram of part A.
Figure 3:
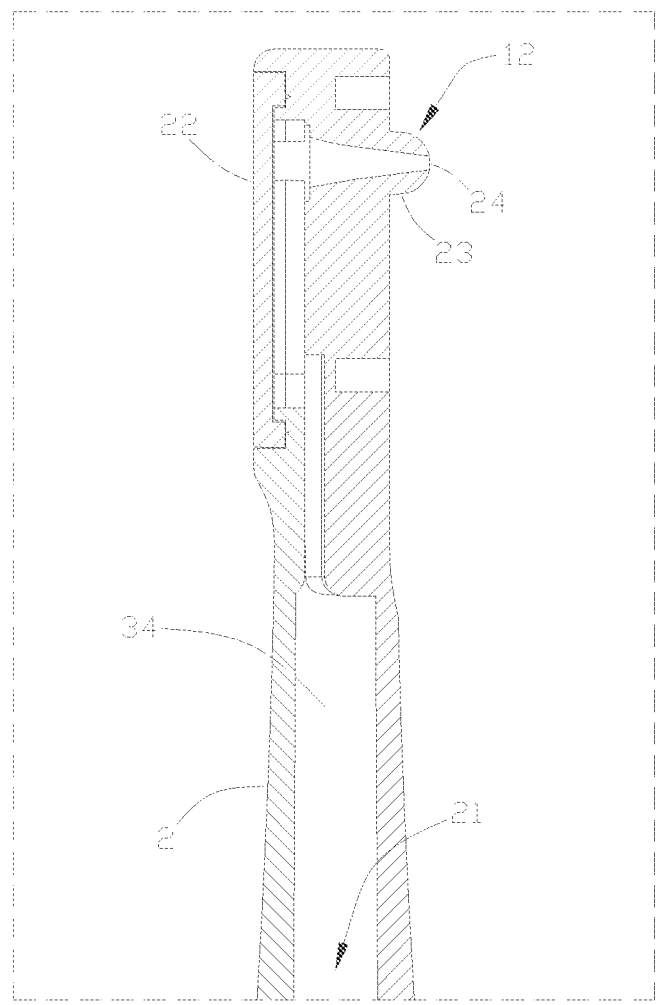
FIG. 3 shows a partially sectional view of a toothbrush head.
Figure 4:
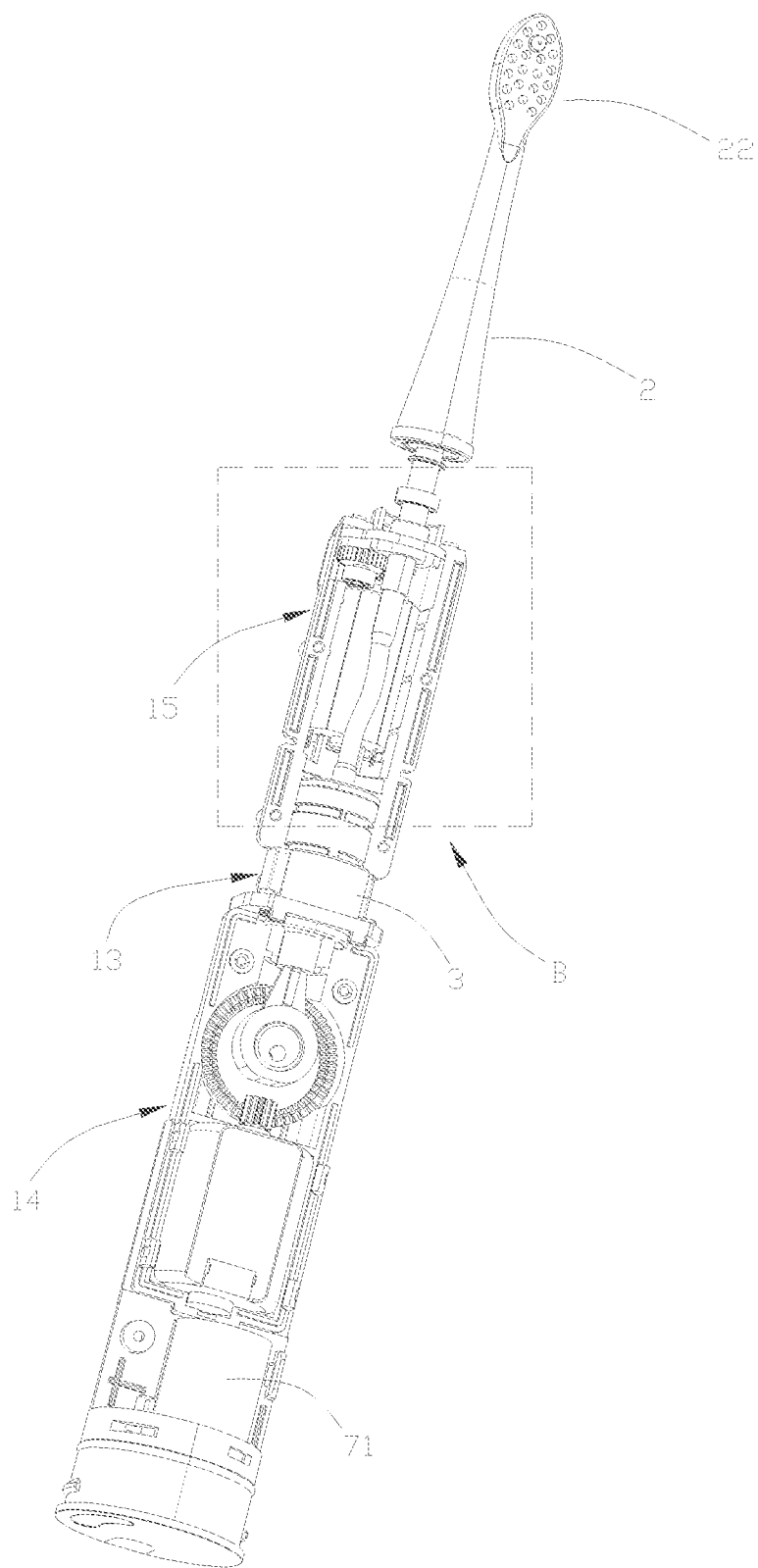
FIG. 4 shows a schematic diagram of a connected state of a pumping mechanism, a transmission mechanism, and a connection valve.
Figure 5:
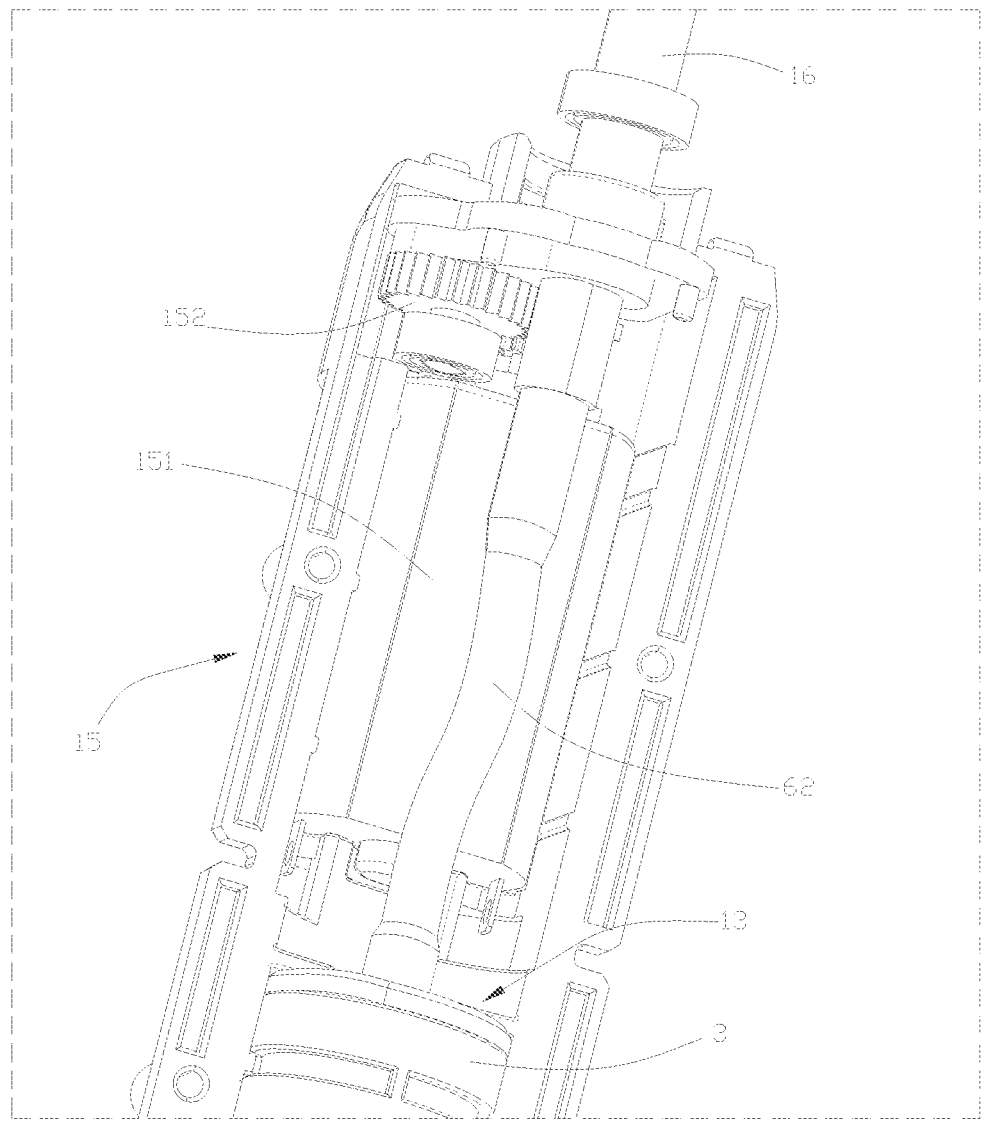
FIG. 5 shows a partially enlarged diagram of part B.
Figure 6:
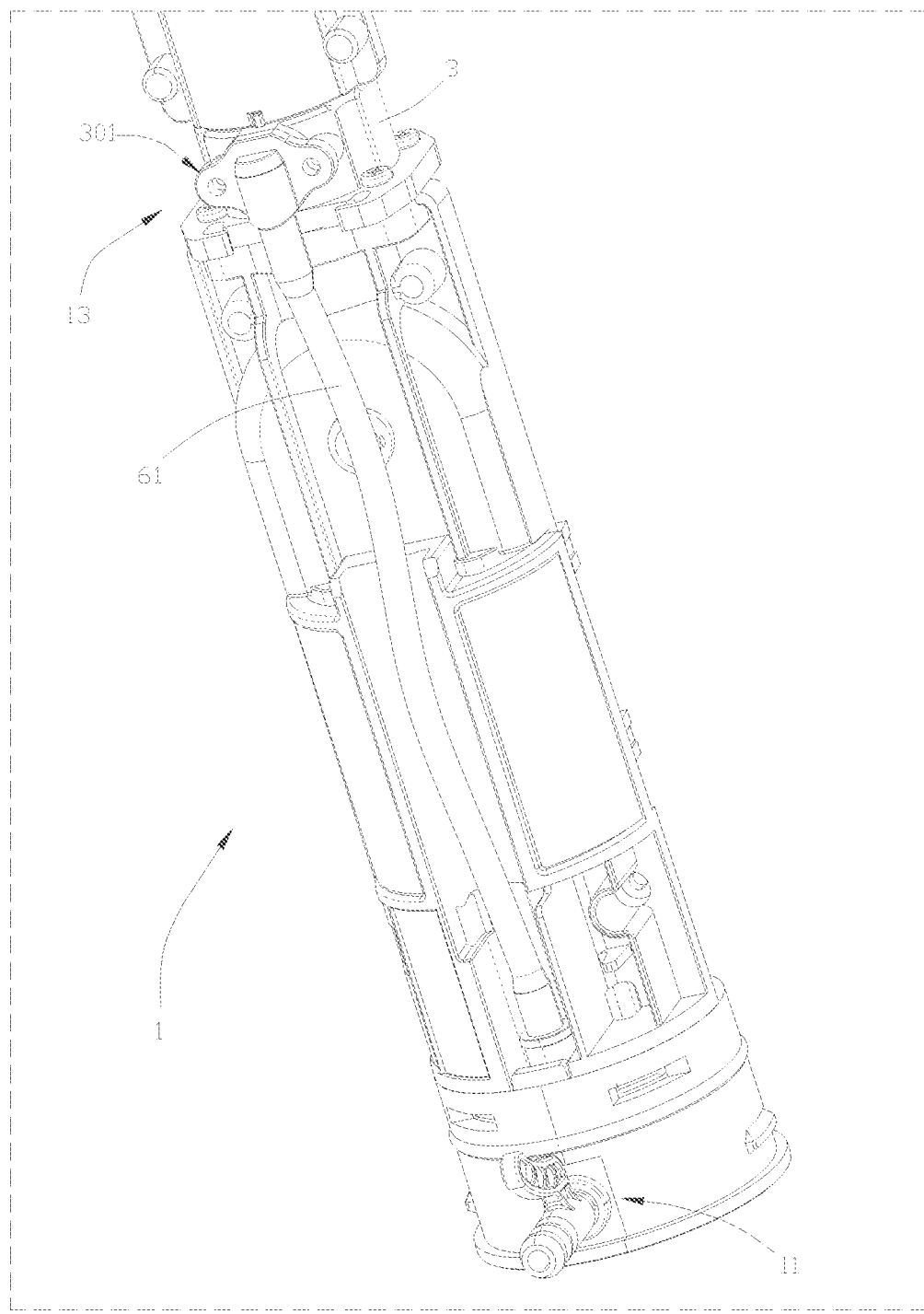
FIG. 6 shows a partial diagram of the back side of FIG. 4.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically define.

As shown in FIG. 1 to FIG. 14, an electric toothbrush with a rinsing function includes a handle 1 and a toothbrush head 2. The toothbrush head 2 is connected to the handle 1. The handle 1 is provided with a liquid feeding port 11. The toothbrush head 2 is provided with a liquid discharging port 12. The liquid feeding port 11 is communicated to the liquid discharging port 12 through a liquid transfer passageway 13. The liquid transfer passageway 13 is provided with a pumping mechanism 14. The pumping mechanism 14 is used for providing a pumping force for the liquid transfer passageway 13, so as to transfer liquid from the liquid feeding port 11 to the liquid discharging port 12 and spray the liquid. The handle 1 is provided with a transmission mechanism 15. The transmission mechanism 15 is connected to the toothbrush head 2 to drive the toothbrush head 2 have a reciprocating motion relative to the handle 1.

The liquid feeding port 11 is connected to an external water source. During use, a hose can be arranged at the liquid feeding port, and is placed in clean water or cleaning fluid. During use, the equipment is turned on to respectively control the pumping mechanism 14 and the transmission mechanism 15 to work. The pumping mechanism 14 is used for providing the pumping force for the liquid transfer passageway 13, so as to pump the external water source into the liquid feeding port 11 and transfer the external water source to the liquid discharging port 12 through the liquid transfer passageway 13, and the external water source is finally sprayed by the liquid discharging port 12 to form a pulse spout to achieve a teeth rinsing effect. The transmission mechanism 15 is used for providing power for the toothbrush head 2 for swinging relative to the handle 1. When teeth need to be brushed, the transmission mechanism 15 can be started to enable the toothbrush head 2 to swing left and right, so as to achieve a teeth brushing effect. In the teeth brushing process, when the teeth need to be cleaned with the clean water or cleaning fluid, the pumping mechanism 14 can be started. Under the action of the pumping mechanism 14, the clean water or cleaning fluid is sprayed via the liquid discharging port 12 to achieve the teeth rinsing effect. Compared with the traditional electric toothbrush or a traditional water pick, the electric toothbrush of the present disclosure can rinse the teeth while brushing the teeth, so that teeth brushing and teeth rinsing can be simultaneously carried out. This electric toothbrush is convenient to use and has a good user experience.

As shown in FIG. 10 to FIG. 14, the liquid transfer passageway 13 includes a connection valve 3; the connection valve 3 is provided with a first chamber 31, a second chamber 32, and a third chamber 33; the first chamber 31 is communicated with the second chamber 32 through the third chamber 33; the first chamber 31 is provided with a liquid inlet 301; the liquid inlet 301 is communicated with the liquid feeding port 11; the second chamber 32 is provided with a liquid outlet 302; and the liquid outlet 302 is communicated with the liquid discharging port 12.

The pumping mechanism 14 is connected to the connection valve 3 to provide a pumping force for the connection valve 3. Under the action of the pumping force, external liquid is pumped into the liquid inlet 301 via the liquid feeding port 11. The liquid enters the first chamber 31 from the liquid inlet 301. The liquid in the first chamber 31 is transferred to the second chamber 32 through the third chamber 33, and is finally transferred to the liquid discharging port 12 via the liquid outlet 302 of the second chamber 32 and sprayed by the liquid discharging port 12.

A drainage portion 30 is arranged between the third chamber 33 and the first chamber 31. A first liquid guide opening 51 is formed in the drainage portion 30 to communicate the third chamber 33 to the first chamber 31. The third chamber 33 is further provided with a second liquid guide opening 52. The second liquid opening 52 is communicated with the second chamber 32. By the above-mentioned structural arrangement, the liquid in the first chamber 31 enters the third chamber 33 via the first liquid guide opening 51, and the liquid in the third chamber 33 enters the second chamber 32 via the second liquid guide opening 52.

The second chamber 32 is provided with a one-way valve 42, such as a duckbill valve, at the liquid outlet 302. The one-way valve 42 is used for controlling opening and closing of the liquid outlet 302. The connection valve 3 further includes an umbrella-shaped valve 43. The umbrella-shaped valve 43 is provided with a head portion 431 and an umbrella handle portion 432. A plugging hole 53 is formed in drainage portion 30. The umbrella handle portion 432 is fixedly arranged in the plugging hole 53, so that the head portion 431 of the umbrella-shaped valve 43 is clung to the first liquid guide opening 51 to block the first liquid guide opening 51. The head portion 431 of the umbrella-shaped valve 43 is made of an elastic material, such as rubber and silica gel. A detent boss 4321 is also arranged on the umbrella handle portion 432. When the umbrella handle portion 432 is plugged into the plugging hole 53, the detent boss 4321 resists against the drainage portion 30 to play a role of fixing the umbrella-shaped valve 43. A pumping port 331 is arranged below the third chamber 33. A transmission end of the pumping mechanism 14 is connected to the pumping port 331 and does reciprocating motion in the pumping port 331 to provide the pumping force for the connection valve 3, so as to transfer the liquid into the liquid inlet 301 via the liquid feeding port 11 and spray the liquid via the liquid outlet 302.

The second chamber 32 is arranged right above the first chamber 31. A first plug 41 is arranged between the second chamber 32 and the first chamber 31 to avoid direct communication between the second chamber 32 and the first chamber 31. The third chamber 33 is arranged right below the first chamber 31, and a partition plate is formed between the third chamber 33 and the first chamber 31 to form the drainage portion 30. Several through holes running through the partition plate are formed in the partition plate, so as to form the first liquid guide opening 51 and the plugging hole 53. The first chamber 31 is communicated with the third chamber 33 through the first liquid guide opening 51 on the partition plate. The second liquid guide opening 52 of the third chamber 33 extends up between an inner side wall of the third chamber 33 and an outer side wall of the first chamber 31, so as to be communicated with the second chamber 32 and form a rectangular opening in an inner side wall of the second chamber 32.

Figure 7:
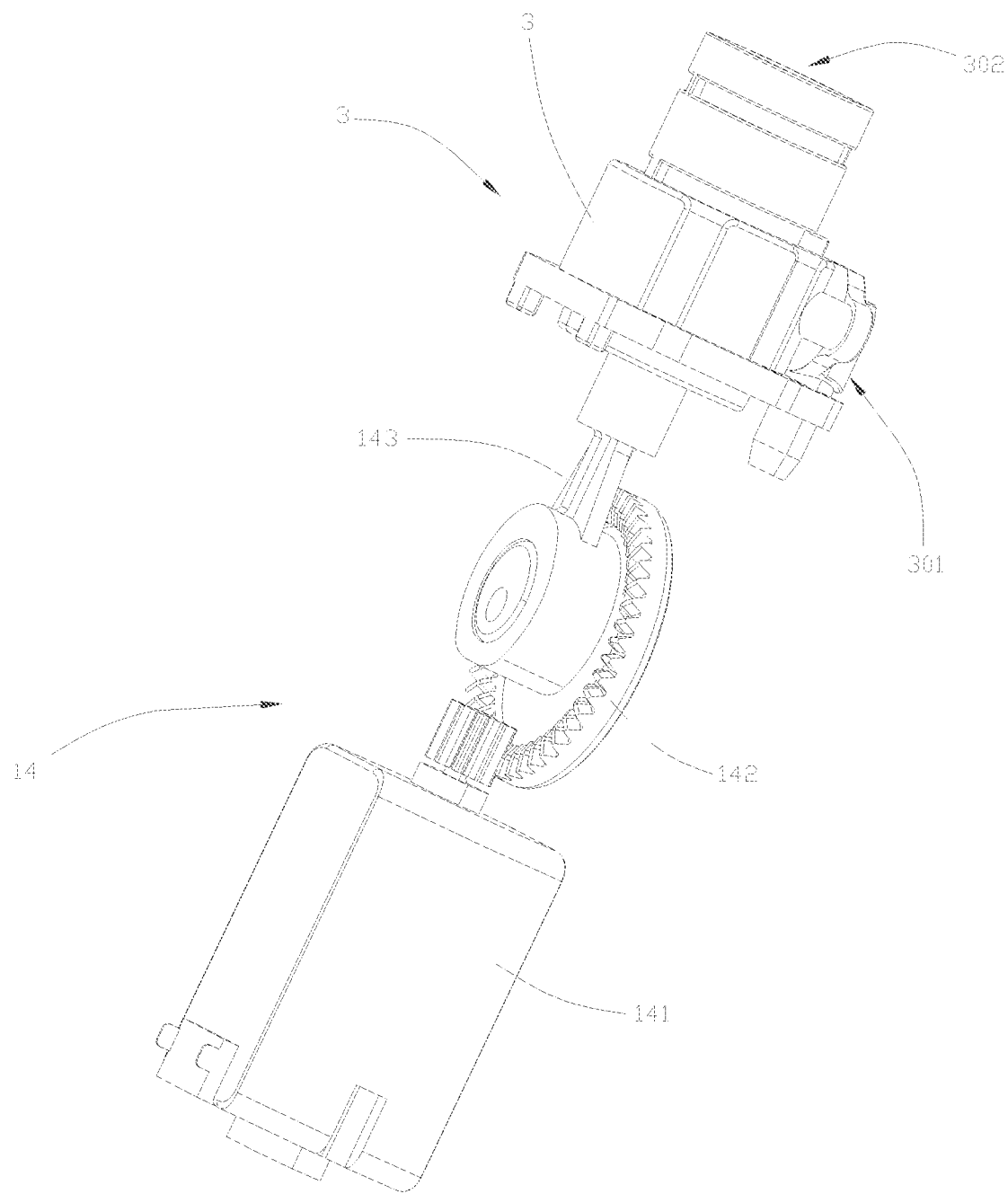
FIG. 7 shows a schematic diagram of a connected state of a pumping mechanism and a connection valve.
Figure 8:
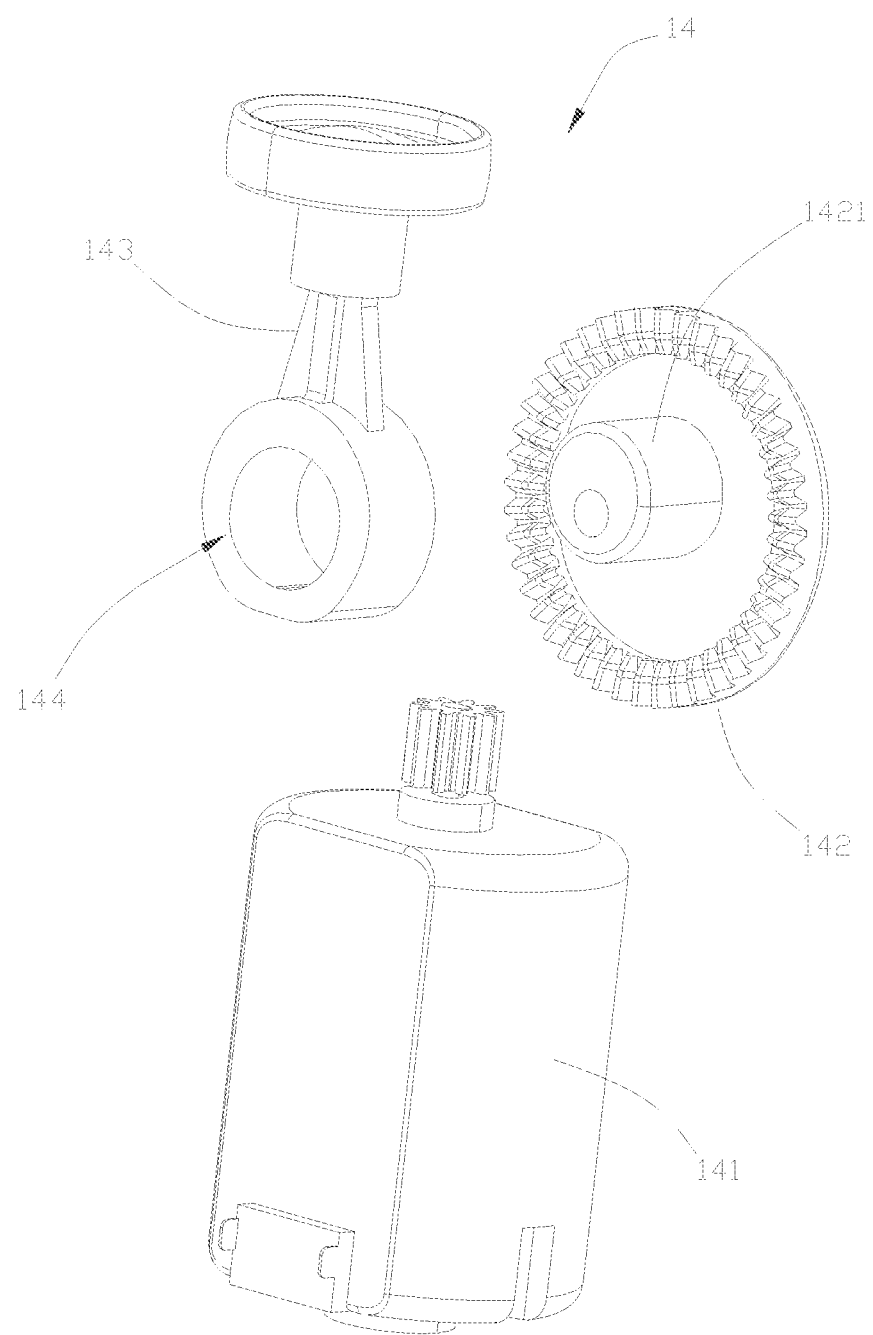
FIG. 8 shows an exploded diagram of a pumping mechanism.
Figure 9:
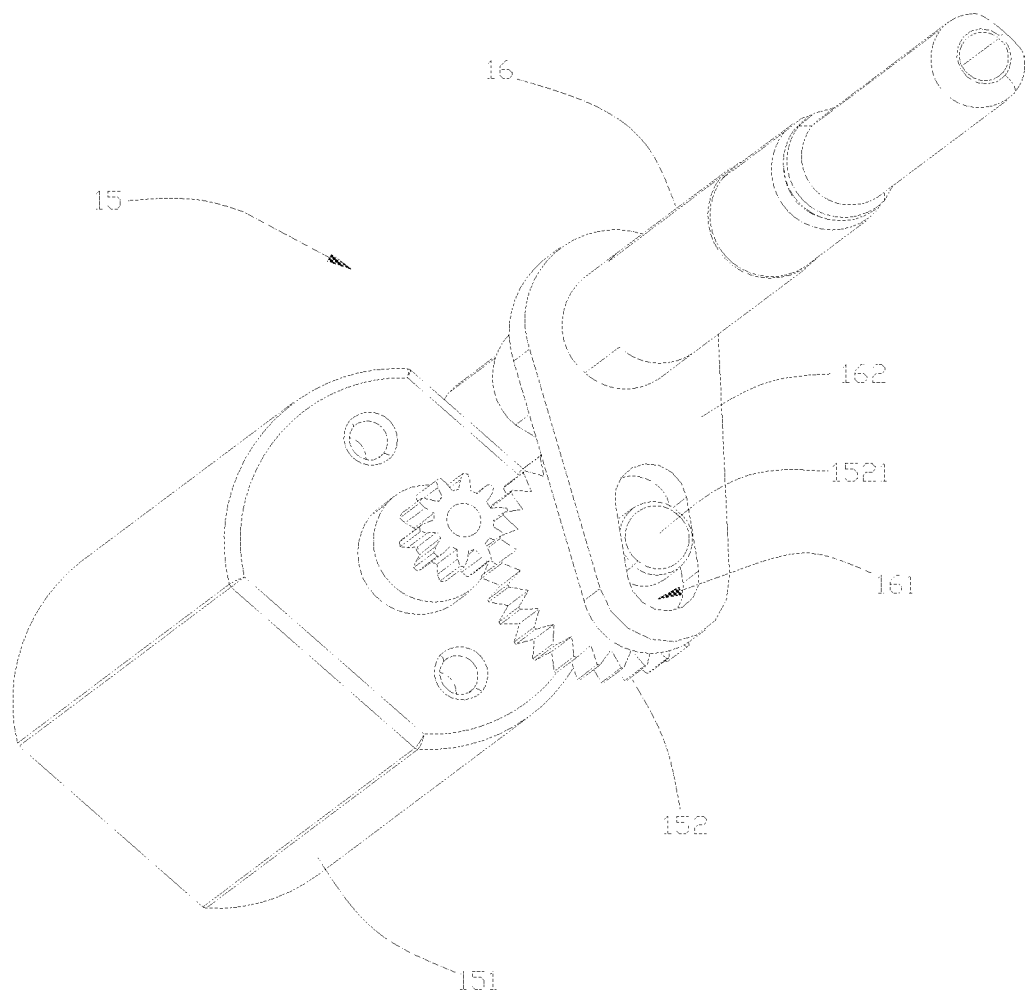
FIG. 9 shows a schematic diagram of connection between a transmission mechanism and a connector.
Figure 12:
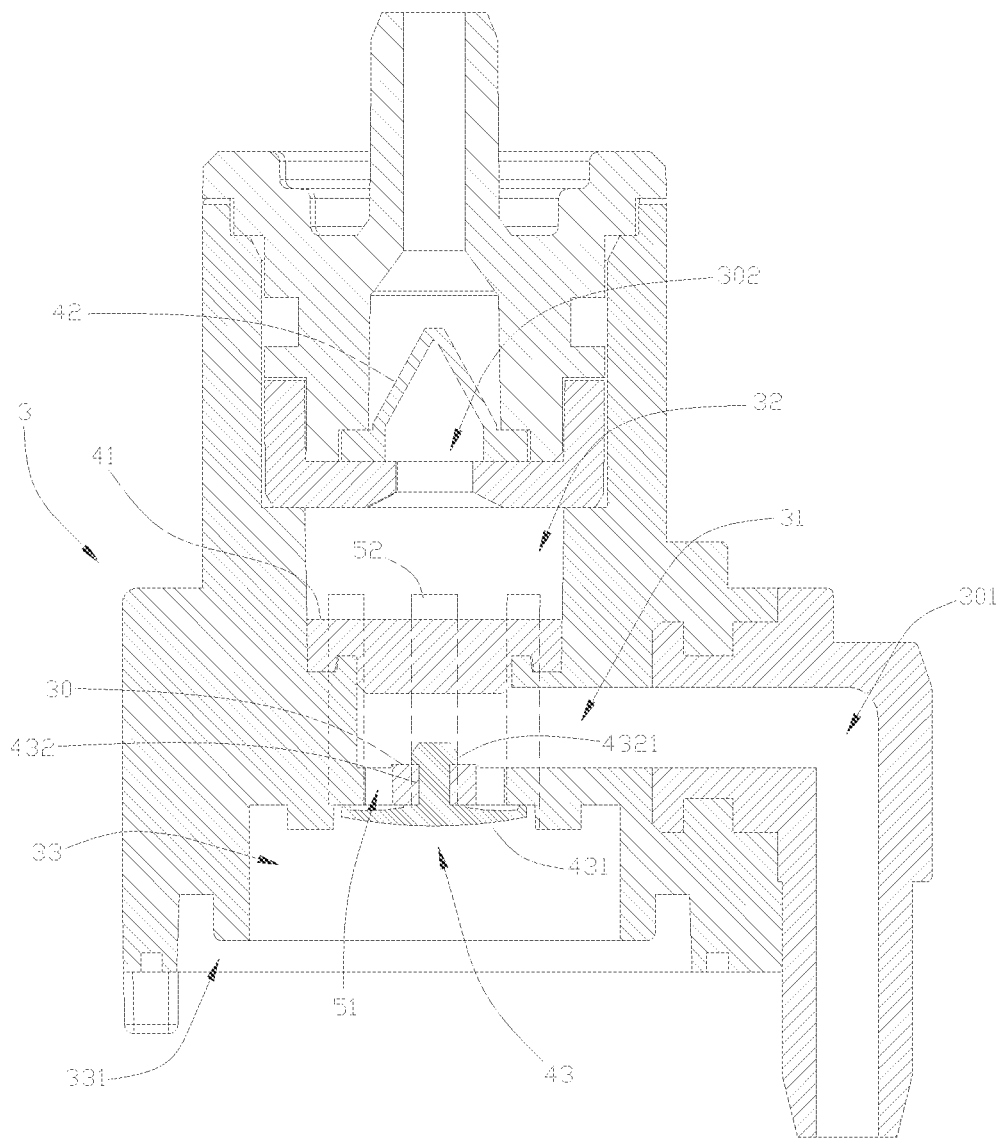
FIG. 12 shows a sectional view of a connection valve (the dotted lines in the drawing represent a passageway of a second liquid guide opening)

How the pumping mechanism 14 provides the pumping force for the connection valve 3 is described below:

As shown in FIG. 7 and FIG. 12, when the equipment is stopped, the head portion 431 of the umbrella-shaped valve 43 is clung to the first liquid guide opening 51 to block the first liquid guide opening 51. The one-way valve 42 is closed to block the liquid outlet 302 of the second chamber 32. By the above-mentioned structural arrangement, the transmission end of the pumping mechanism 14, the third chamber 33, and the second chamber 32 jointly form a first closed space.

Figure 13:
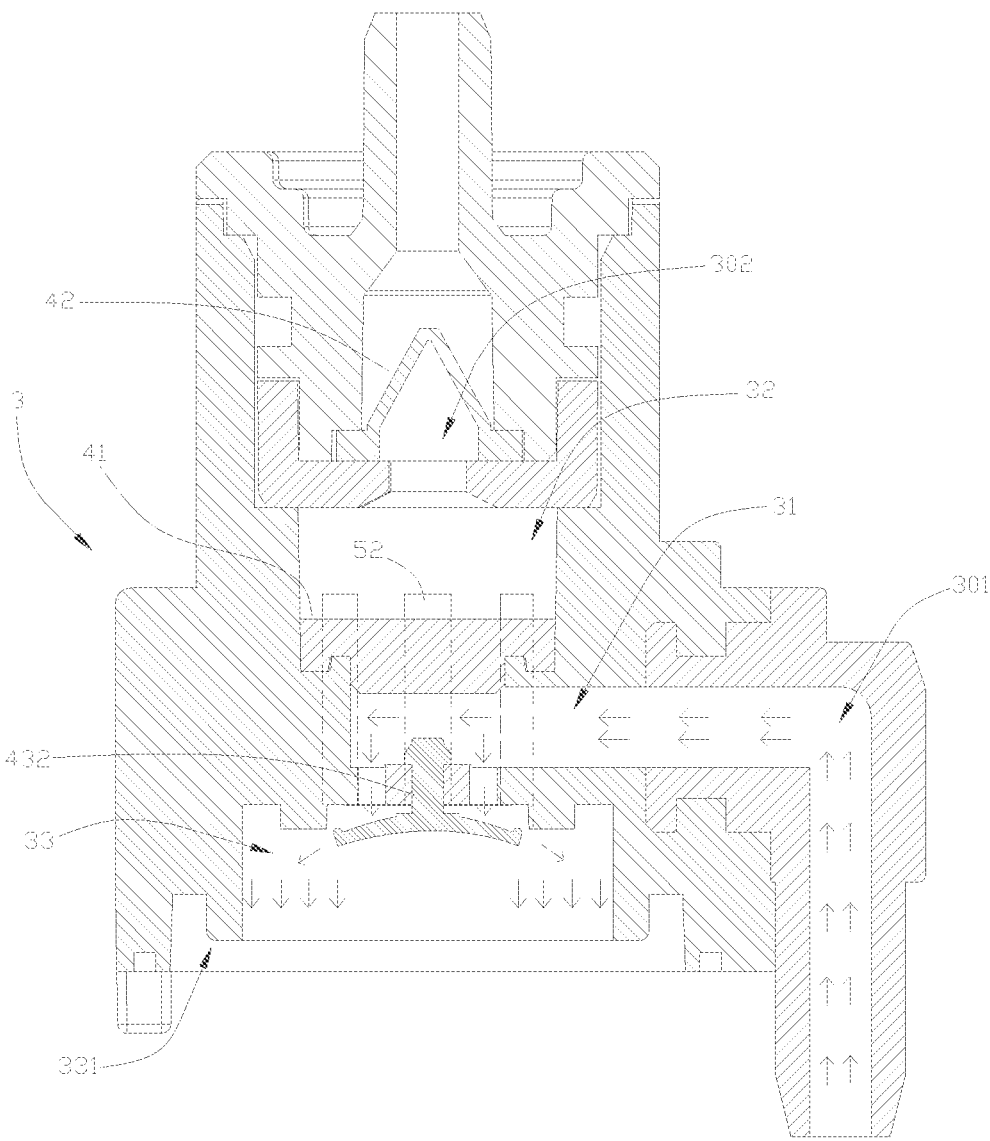
FIG. 13 shows a schematic diagram of liquid feeding in a sectional state of a connection valve (the arrows in the drawing represent a flowing direction of liquid)

When the pumping mechanism 14 is started, the transmission end of the pumping mechanism 14 does reciprocating motion in the pumping port 331. When the transmission end of the pumping mechanism 14 moves down, as shown in FIG. 13, a negative pressure is formed in the first closed space to drive the head portion 431 of the umbrella-shaped valve 43 to deform, so that the head portion 431 is away from the first liquid guide opening 51 to open the first liquid guide opening 51. The first liquid guide opening 51 communicates the first closed space with the first chamber 31. At this time, a pressure difference is formed between the first chamber 31 and the external atmosphere, so as to pump the external liquid into the first chamber 31 via the liquid inlet 301. The liquid in the first chamber 31 then enters the third chamber 33 via the first liquid guide opening 51.

Figure 10:
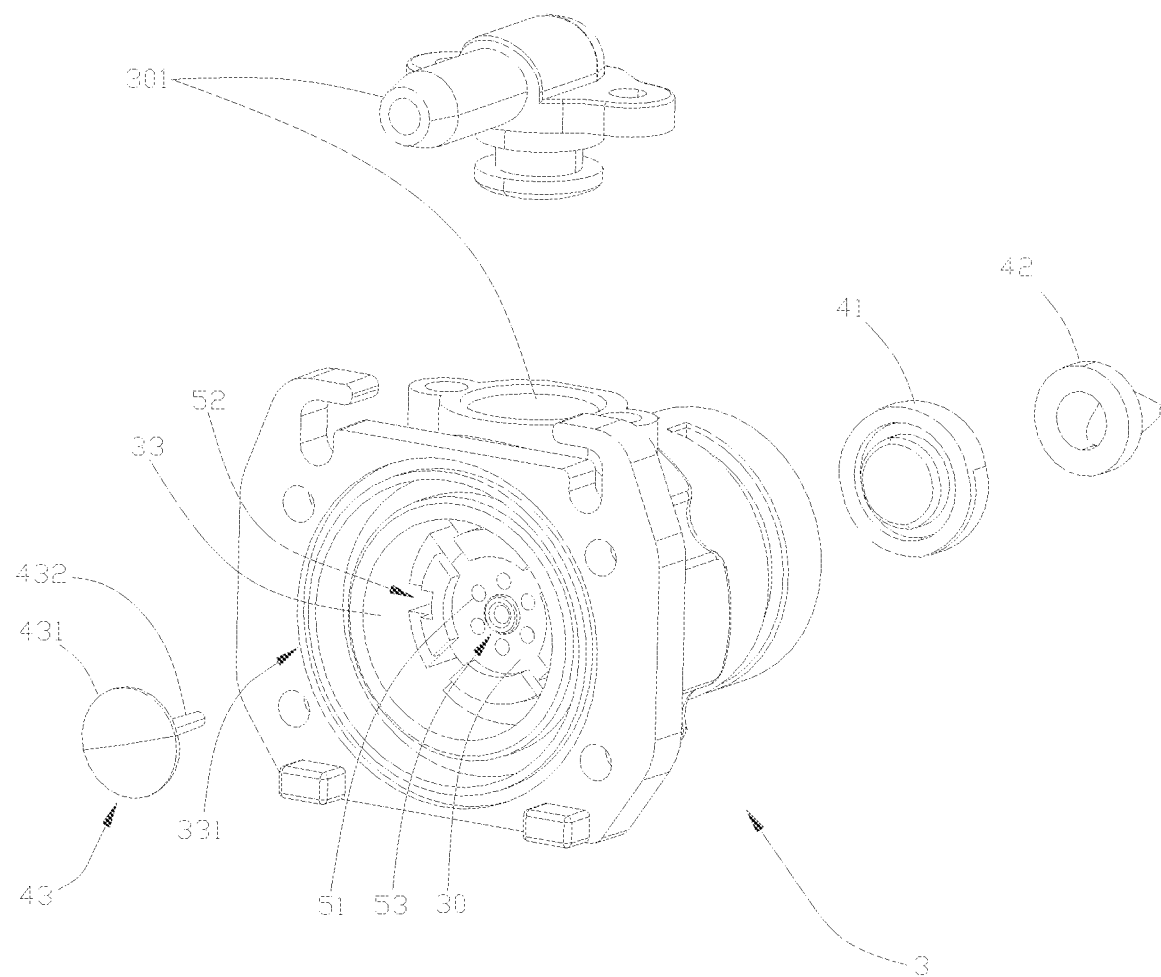
FIG. 10 shows an exploded state diagram of a connection valve.
Figure 11:
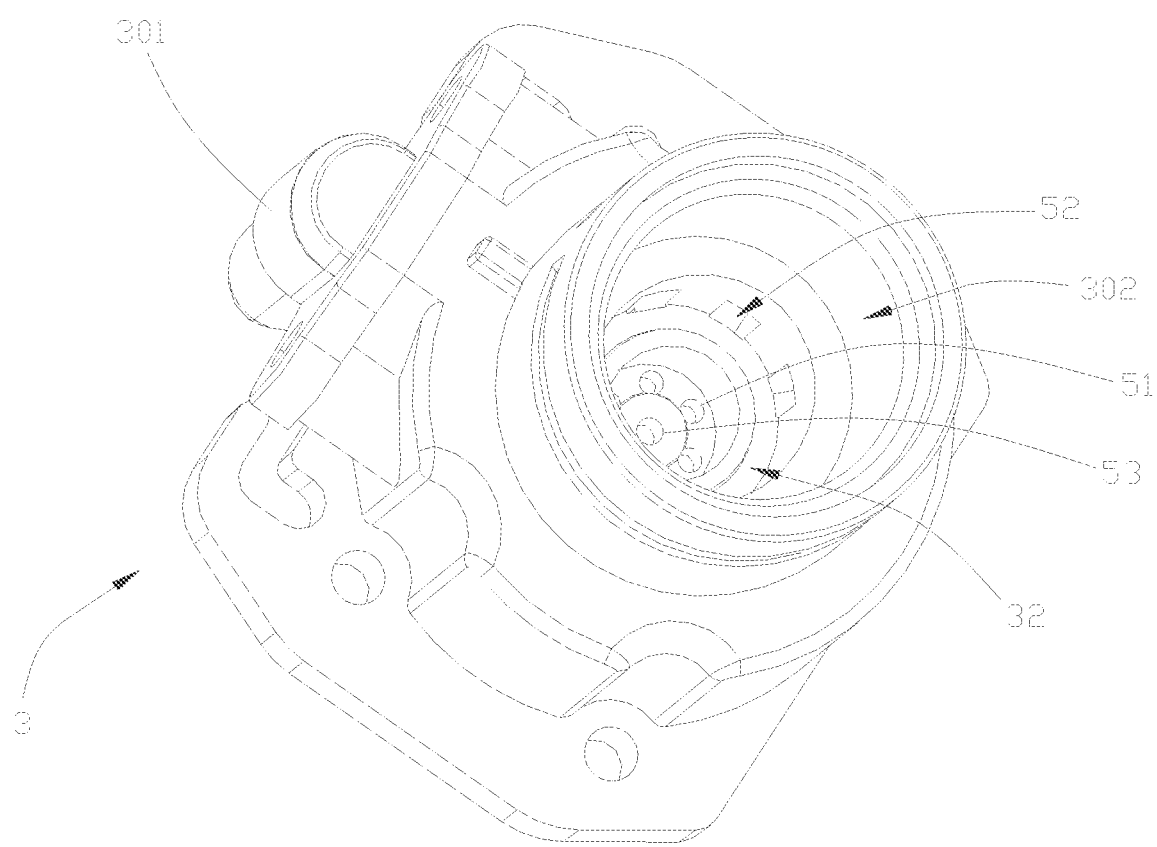
FIG. 11 shows a three-dimensional diagram of a connection valve.
Figure 14:
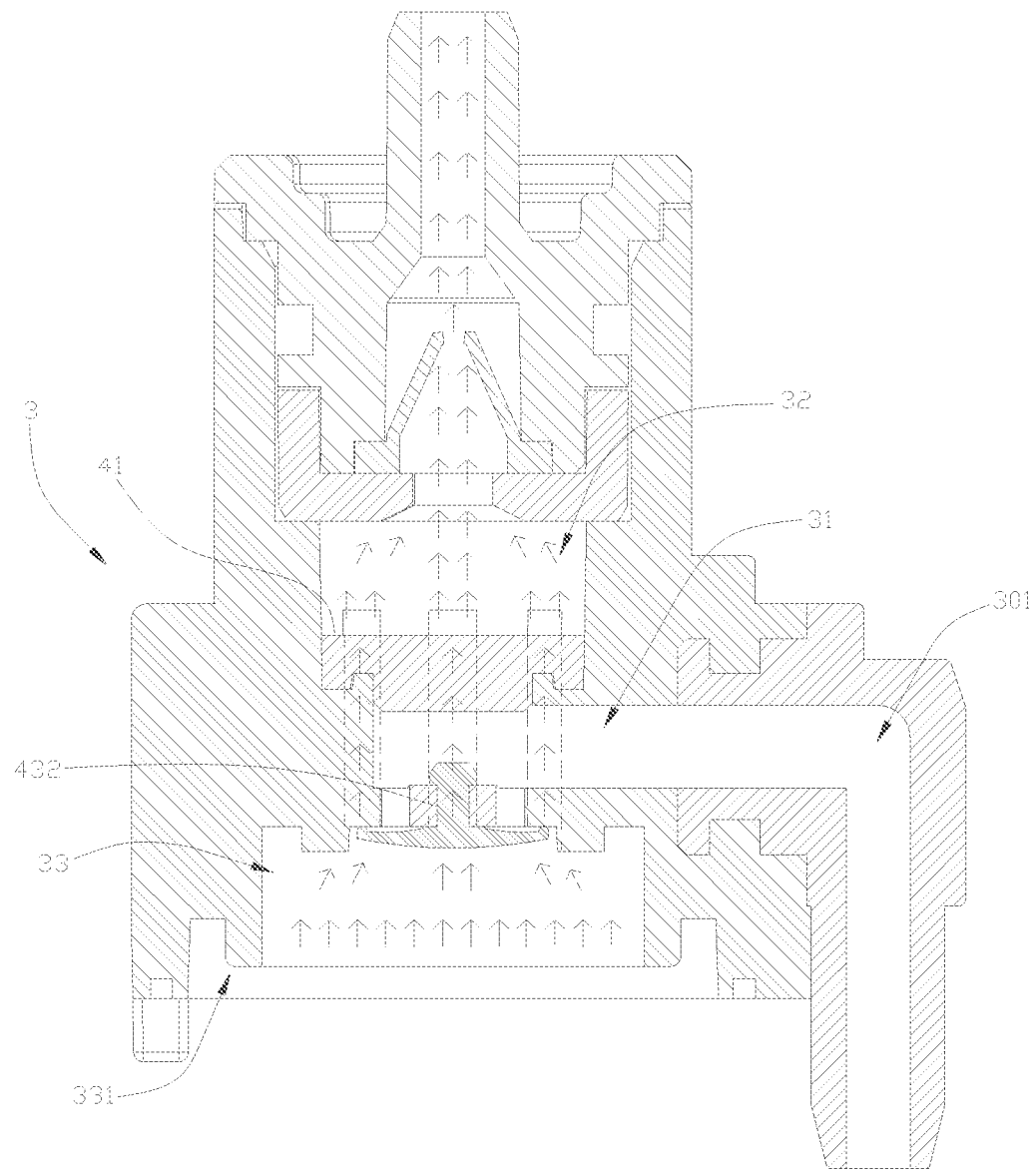
FIG. 14 shows a schematic diagram of liquid discharging in a sectional state of a connection valve.

When the transmission end of the pumping mechanism 14 moves up, as shown in FIG. 10, FIG. 11, and FIG. 14, the liquid in the third chamber 33 is pressed by the transmission end of the pumping mechanism 14, so that the liquid rushes into the second chamber 32 via the second liquid guide opening 52 and is discharged from the liquid outlet 302 via the one-way valve 42 (it should be noted that in this embodiment, the one-way valve 42 is a duckbill valve, the top of which will be opened under an impact and will be closed when the impact disappears). The liquid is finally formed into a pulse spout at the liquid discharging port 12 and sprayed out. Meanwhile, in this process, the head portion 431 of the umbrella-shaped valve 43 will be rebounded and clung to the first liquid guide opening 51 to block the first liquid guide opening 51, thus preventing the liquid from being discharged from the liquid inlet 301.

By means of the above step, when the transmission end of the pumping mechanism 14 moves down, the liquid enters the connection valve 3 via the liquid inlet 301. When the transmission end of the pumping mechanism 14 moves up, the liquid is discharged out of the connection valve 3 from the liquid outlet 302 in the form of the pulse spout, so as to provide the pumping force, thus transferring the liquid into the liquid inlet 301 via the liquid feeding port 11, and the liquid is formed into the pulse spout at the liquid outlet 302 and sprayed out.

The pumping mechanism 14 includes a first driving device 141, a first eccentric wheel 142, and a transmission rod 143. A rotating end of the first driving device 141 is in meshing connection with the first eccentric wheel 142. The first eccentric wheel 142 is provided with a first eccentric portion 1421. The transmission rod 143 sleeves the first eccentric portion 1421 to achieve the reciprocating motion of the transmission rod 143.

The first driving device 141 may be a small-sized motor. The lower end of the transmission rod 143 is provided with an annular sleeve portion 144. The annular sleeve portion 144 sleeves the first eccentric portion 1421. The first driving device 141 is used for driving the first eccentric wheel 142 to rotate. The rotating first eccentric wheel 142 will drive the first eccentric portion 1421 to eccentrically rotate. The eccentrically rotating first eccentric portion 1421 drives the transmission rod 143 to do reciprocating motion.

The handle 1 further includes a connector 16. The connector 16 is internally hollow, a lower end of which is communicated with the liquid outlet 302 and an upper end of which is communicated with the liquid discharging port 12. The connector 16 is detachably connected to the toothbrush head 2 to detachably connect the toothbrush head 2 to the handle 1.

By the above-mentioned structural arrangement, the pulse spout sprayed from the liquid outlet 302 is transferred to the liquid discharging port 12 via the connector 16 and is sprayed out of the liquid discharging port 12.

The transmission mechanism 15 includes a second driving device 151 and a second eccentric wheel 152. The connector 16 is provided with a connection portion 162. The connection portion 162 is provided with a connection slot 161. A transmission end of the second driving device 151 is in meshing connection to the second eccentric wheel 152. The second eccentric wheel 152 is provided with a second eccentric portion 1521. The second eccentric portion 1521 is sleeved in the connection slot 161 to achieve reciprocating vibration of the connector 16.

The second driving device 151 may be a small-sized motor. The connection portion 162 is perpendicular to the connector 16. The second driving device 151 is used for driving the second eccentric wheel 152 to rotate. The rotating second eccentric wheel 152 will drive the second eccentric portion 1521 to eccentrically rotate. The eccentrically rotating second eccentric portion 1521 does reciprocating motion in the connection slot 161 to drive the transmission rod 143 to do reciprocating motion.

The handle 1 further includes a first liquid guide pipe 61 and a second liquid guide pipe 62. One end of the first liquid guide pipe 61 is communicated to the liquid feeding port 11, and the other end is communicated to the liquid inlet 301. One end of the second liquid guide pipe 62 is communicated to the liquid outlet 302, and the other end is communicated to the lower end of the connector 16. The toothbrush head 2 is internally hollow to form a fourth chamber 34. The fourth chamber 34 forms a connection port 21 in the lower end of the toothbrush head 2. The connection port 21 sleeves an upper end of the connector 16 to detachably connect the toothbrush head 2 to the connector 16. The upper end of the toothbrush head 2 is provided with a toothbrush head portion 22. A protrusion portion 23 integrated with the toothbrush head portion 22 is arranged on the toothbrush head portion 22. The protrusion portion 23 is provided with a liquid spraying hole 24. The liquid spraying hole 24 is communicated with the fourth chamber 34 to form the liquid discharging port 12.

By the above-mentioned structural arrangement, under the action of the pumping mechanism 14, the liquid enters the first liquid guide pipe 61 through the liquid feeding port 11, and is transferred to the connection valve 3 via the liquid inlet 301 by the first liquid guide pipe 61. The liquid entering the connection valve 3 is sprayed via the liquid outlet 302, and is then transferred to the connector 16 through the second liquid guide pipe 62. The pulse water flow in the connector 16 will pass through the fourth chamber 34, and is finally sprayed from the liquid spraying hole 24 of the protrusion portion 23 to form the pulse spout. When teeth need to be brushed, the transmission mechanism 15 can be started to enable the toothbrush head 2 to drive the toothbrush head portion 22 to do reciprocating motion. Bristles or other cleaners can be disposed on the toothbrush head portion 22, so as to achieve a teeth brushing effect. When the teeth need to be rinsed, the pumping mechanism 14 can be started. Under the action of the pumping mechanism 14, the clean water or cleaning fluid will be formed into the pulse spout and sprayed from the liquid spraying hole 24, so as to achieve a teeth rinsing effect.

A built-in power supply 71 is arranged in the handle 1. The built-in power supply 71 is electrically connected to the pumping mechanism 14 and the transmission mechanism 15 to provide electric energy for the pumping mechanism 14 and the transmission mechanism 15 to work. By the above-mentioned structural arrangement, the built-in power supply 71 is arranged in the handle, so that during use, it is not necessary to separately connect the toothbrush to an external power supply, which makes the use process safer and avoids the problems of short circuit and leakage. When the built-in power supply 71 is in low power, an external power supply can be connected to charge the built-in power supply 71. The toothbrush is used safely and conveniently.

In order to achieve the above charge function, a charge port 72 is arranged at the bottom of the handle 1. The charge port 72 is electrically connected to the built-in power supply 71. Preferably, the charge port 72 is detachably provided with a sealing member used for preventing the liquid from entering the charge port 72 to cause a short circuit.

A toothbrush switch 73, a rinsing switch 74, and a rinsing strength switch 75 are also arranged on the handle 1. The toothbrush switch 73 is used for controlling the transmission mechanism 15. Specifically, a discontinuous press on the toothbrush switch 73 can control the transmission mechanism 15 to be started or stopped. When the transmission mechanism 15 works, a long press on the toothbrush switch 73 can adjust a work level of the transmission mechanism 15. When the teeth need to be separately brushed, the discontinuous press can be made to the toothbrush switch 73. Under the action of the transmission mechanism 15, the toothbrush head 2 will swing left to right to achieve the teeth brushing effect. A user can make a long press to the toothbrush switch 73 according to a personal need to adjust the level of the transmission mechanism 15, so as to control the frequency of the left and right swinging of the toothbrush head 2.

The rinsing switch 74 is used for controlling the pumping mechanism 14 to be started or stopped. The rinsing strength switch 75 is used for controlling a work level of the pumping mechanism 14. When the teeth need to be rinsed separately, a discontinuous press can be made to the rinsing switch 74 to start the pumping mechanism 14. Under the action of the pumping mechanism 14, the clean water or cleaning fluid will be formed into the pulse spout by the liquid discharging port and sprayed out, so as to achieve a teeth rinsing effect. The user can make a discontinuous press to the rinsing strength switch 75 according to a personal need, so as to control the rinsing strength of the pulse spout.

The user can synchronously brush and rinse the teeth through the above setting. During use, a discontinuous press is first made to the toothbrush switch 73 to start the transmission mechanism 15, so as to drive the toothbrush head 2 to swing left and right to brush the teeth. When the teeth need to be rinsed in the teeth brushing process, a discontinuous press can be made to the rinsing switch 74 to start the pumping mechanism 14, so that the clean water or cleaning fluid is formed into the pulse spout by the liquid discharging port and sprayed out to rinse the teeth. Furthermore, in the above-mentioned teeth brushing and rinsing processes, the user can also select different teeth brushing strengths and teeth rinsing strengths according to a personal need.

Buttons of the above-mentioned toothbrush switch 73, rinsing switch 74 and rinsing strength switch 75 can be set to be in different sizes and shapes. During use, the user can distinguish different functional buttons according to the touched buttons in different shapes or sizes, so as to achieve an effect of blind recognition.

The electric toothbrush further includes a first waterproof member, a second waterproof member, and a third waterproof member. Specifically, the first waterproof member is a waterproof O ring arranged at the bottom of the handle 1 to waterproof the bottom of the handle 1. The second waterproof member and the third waterproof member are arranged at a joint of the handle 1 and the toothbrush head 2. Specifically, the second waterproof member is hooped on the connector 16 at the joint of the handle 1 and the toothbrush head 2 to prevent the liquid from flowing back into the handle 1 via the joint. The third waterproof member is arranged below the second waterproof member, and an outer side wall of the third waterproof member is clung to an inner side wall of a shell of the handle 1, so as to further achieve a waterproof effect.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. An electric toothbrush, comprising a handle and a toothbrush head, wherein the toothbrush head is connected to the handle; the handle is provided with a liquid feeding port; the toothbrush head is provided with a liquid discharging port; the liquid feeding port is communicated to the liquid discharging port through a liquid transfer passageway;

the liquid transfer passageway is provided with a pumping mechanism; the pumping mechanism is used for providing a pumping force for the liquid transfer passageway, so as to transfer liquid from the liquid feeding port to the liquid discharging port and spray the liquid; the handle is provided with a transmission mechanism; and the transmission mechanism is connected to the toothbrush head to drive the toothbrush head to have a reciprocating motion relative to the handle, wherein the liquid transfer passageway comprises a connection valve; the connection valve is provided with a first chamber, a second chamber, and a third chamber; the first chamber is communicated with the second chamber through the third chamber; the first chamber is provided with a liquid inlet; the liquid inlet is communicated with the liquid feeding port; the second chamber is provided with a liquid outlet; and the liquid outlet is communicated with the liquid discharging port.

2. The electric toothbrush according to claim 1, wherein a drainage portion is arranged between the third chamber and the first chamber; a first liquid guide opening is formed in the drainage portion to communicate the third chamber to the first chamber; the third chamber is further provided with a second liquid guide opening; and the second liquid opening is communicated with the second chamber.

3. The electric toothbrush according to claim 2, wherein the second chamber is provided with a one-way valve at the liquid outlet; the one-way valve is used for controlling opening and closing of the liquid outlet; the connection valve further comprises an umbrella-shaped valve; the umbrella-shaped valve is provided with a head portion and an umbrella handle portion; a plugging hole is formed in drainage portion; and the umbrella handle portion is fixed in the plugging hole, so that the head portion of the umbrella-shaped valve is clung to the first liquid guide opening to block the first liquid guide opening.

4. The electric toothbrush according to claim 3, wherein the third chamber is further provided with a pumping port; and the pumping mechanism is connected to the pumping port, and does a reciprocating motion in the pumping port to provide the pumping force for the connection valve.

5. The electric toothbrush according to claim 1, wherein the pumping mechanism comprises a first driving device, a first eccentric wheel, and a transmission rod; a rotating end of the first driving device is in meshing connection with the first eccentric wheel; the first eccentric wheel is provided with a first eccentric portion; and the transmission rod sleeves the first eccentric portion to achieve a reciprocating motion of the transmission rod.

6. The electric toothbrush according to claim 1, wherein the handle further comprises a connector; the connector is internally hollow, a lower end of which is communicated with the liquid outlet and an upper end of which is communicated with the liquid discharging port; and the connector is detachably connected to the toothbrush head to detachably connect the toothbrush head to the handle.

7. The electric toothbrush according to claim 6, wherein the transmission mechanism comprises a second driving device and a second eccentric wheel; the connector is provided with a connection slot; a transmission end of the second driving device is in meshing connection to the second eccentric wheel; the second eccentric wheel is provided with a second eccentric portion; and the second eccentric portion is sleeved in the connection slot and does reciprocating motion in the connection slot to drive the connector to do reciprocating motion.

8. The electric toothbrush according to claim 7, wherein the liquid transfer passageway further comprises a first liquid guide pipe and a second liquid guide pipe; one end of the first liquid guide pipe is communicated to the liquid feeding port, and the other end is communicated to the liquid inlet; and one end of the second liquid guide pipe is communicated to the liquid outlet, and the other end is communicated to a lower end of the connector.

9. The electric toothbrush according to claim 8, wherein the toothbrush head is internally hollow to form a fourth chamber; the fourth chamber forms a connection port in the lower end of the toothbrush head; the connection port sleeves an upper end of the connector to detachably connect the toothbrush head to the connector; the upper end of the toothbrush head is provided with a toothbrush head portion; a protrusion portion integrated with the toothbrush head portion is arranged on the toothbrush head portion; the protrusion portion is provided with a liquid spraying hole; and the liquid spraying hole is communicated with the fourth chamber to form the liquid discharging port.

10. An electric toothbrush, comprising
a handle, the handle is provided with a liquid feeding port;
a toothbrush head, the toothbrush head connected to the handle, the toothbrush head provided with a liquid discharging port; the liquid feeding port communicated to the liquid discharging port through a liquid transfer passageway;
a pumping mechanism disposed at the liquid transfer passageway, the pumping mechanism used for providing a pumping force for the liquid transfer passageway, so as to transfer liquid from the liquid feeding port to the liquid discharging port and spray the liquid; and
a transmission mechanism disposed on the handle, and the transmission mechanism connected to the toothbrush head to drive the toothbrush head to have a reciprocating motion relative to the handle,
wherein the liquid transfer passageway comprises a connection valve; the connection valve is provided with a first chamber, a second chamber, and a third chamber; the first chamber is communicated with the second chamber through the third chamber; the first chamber is provided with a liquid inlet; the liquid inlet is communicated with the liquid feeding port; the second chamber is provided with a liquid outlet; and the liquid outlet is communicated with the liquid discharging port.

11. The electric toothbrush according to claim 10, wherein a drainage portion is arranged between the third chamber and the first chamber; a first liquid guide opening is formed in the drainage portion to communicate the third chamber to the first chamber; the third chamber is further provided with a second liquid guide opening; and the second liquid opening is communicated with the second chamber.

12. The electric toothbrush according to claim 11, wherein the second chamber is provided with a one-way valve at the liquid outlet; the one-way valve is used for controlling opening and closing of the liquid outlet; the connection valve further comprises an umbrella-shaped valve; the umbrella-shaped valve is provided with a head portion and an umbrella handle portion; a plugging hole is formed in drainage portion; and the umbrella handle portion is fixed in the plugging hole, so that the head portion of the umbrella-shaped valve is clung to the first liquid guide opening to block the first liquid guide opening.

13. The electric toothbrush according to claim 12, wherein the third chamber is further provided with a pumping port; and the pumping mechanism is connected to the pumping port, and does a reciprocating motion in the pumping port to provide the pumping force for the connection valve.

14. The electric toothbrush according to claim 10, wherein the pumping mechanism comprises a first driving device, a first eccentric wheel, and a transmission rod; a rotating end of the first driving device is in meshing connection with the first eccentric wheel; the first eccentric wheel is provided with a first eccentric portion; and the transmission rod sleeves the first eccentric portion to achieve a reciprocating motion of the transmission rod.

15. The electric toothbrush according to claim 10, wherein the handle further comprises a connector; the connector is internally hollow, a lower end of which is communicated with the liquid outlet and an upper end of which is communicated with the liquid discharging port; and the connector is detachably connected to the toothbrush head to detachably connect the toothbrush head to the handle.

16. The electric toothbrush according to claim 15, wherein the transmission mechanism comprises a second driving device and a second eccentric wheel; the connector is provided with a connection slot; a transmission end of the second driving device is in meshing connection to the second eccentric wheel; the second eccentric wheel is provided with a second eccentric portion; and the second eccentric portion is sleeved in the connection slot and does reciprocating motion in the connection slot to drive the connector to do reciprocating motion.

17. The electric toothbrush according to claim 16, wherein the liquid transfer passageway further comprises a first liquid guide pipe and a second liquid guide pipe; one end of the first liquid guide pipe is communicated to the liquid feeding port, and the other end is communicated to the liquid inlet; and one end of the second liquid guide pipe is communicated to the liquid outlet, and the other end is communicated to a lower end of the connector.

18. The electric toothbrush according to claim 17, wherein the toothbrush head is internally hollow to form a fourth chamber; the fourth chamber forms a connection port in the lower end of the toothbrush head; the connection port sleeves an upper end of the connector to detachably connect the toothbrush head to the connector; the upper end of the toothbrush head is provided with a toothbrush head portion; a protrusion portion integrated with the toothbrush head portion is arranged on the toothbrush head portion; the protrusion portion is provided with a liquid spraying hole; and the liquid spraying hole is communicated with the fourth chamber to form the liquid discharging port.

* * * * *